United States Patent
Verdier

[15] 3,705,613
[45] Dec. 12, 1972

[54] TIRE HAVING TREAD GROOVES FORMING DOUBLE NETWORK OF CONTINUOUS CURVES

[72] Inventor: Henri Verdier, Beauregard-L Eveque, France

[73] Assignee: Compagnie Generale des Etablissements Michelin raison sociale Michelin & Co., Clermont-Ferrand (Puy-de-Dome), France

[22] Filed: Feb. 23, 1971

[21] Appl. No.: 117,967

[30] Foreign Application Priority Data

Feb. 20, 1970   France..............................7006274

[52] U.S. Cl. .............................................. 152/209
[51] Int. Cl. ............................................. B60c 11/00
[58] Field of Search ...................................... 152/209

[56] References Cited

UNITED STATES PATENTS

| 3,405,753 | 10/1968 | Verdier | 152/209 R |
| 3,094,157 | 6/1963 | Klohn | 152/209 R |
| D175,889 | 10/1955 | Jones | 152/209 D |
| 3,584,670 | 6/1971 | Verdier | 152/209 R |

*Primary Examiner*—Gerald M. Forlenza
*Assistant Examiner*—D. W. Keen
*Attorney*—Brumbaugh, Graves, Donohue & Raymond

[57] ABSTRACT

A tire has a tread formed with circumferential grooves following curves that are broken or undulating. The amplitudes of the curves increase in a direction from one edge towards the other edge of the tread. Over more than half the width of the tread, the curves followed by the grooves are substantially in phase opposition, and the grooves are connected to each other in such a manner that segments of one groove lie substantially in extensions of segments of an adjacent groove.

7 Claims, 2 Drawing Figures

PATENTED DEC 12 1972

3,705,613

INVENTOR.
HENRI VERDIER

BY
Brumbaugh, Graves, Donohue & Raymond his ATTORNEYS

TIRE HAVING TREAD GROOVES FORMING DOUBLE NETWORK OF CONTINUOUS CURVES

BACKGROUND OF THE INVENTION

This invention relates to pneumatic tires and, more particularly to novel and highly-effective improvements in treads for new or recapped pneumatic tires.

It is conventional to provide the tread of a tire with a plurality of circumferential grooves, each groove describing a broken or undulating line, and the several grooves respectively extending over regions the transverse widths of which progressively increase from one side of the tread to the other. It is also known to mount such tires on vehicles in such a manner that the widths of the circumferential grooves themselves increase from the edge of the tire tread located towards the outside of the vehicle to the edge of the tread located towards the inside of the vehicle. Such a group of circumferential grooves with amplitudes in phase has been described in French Pat. No. 1,451,578, or its equivalent U.S. Pat. No. 3,405,753. Tires having treads of the type described above behave, in general, well on dry roads, particularly at high speed. The same is true on a wet road. However, in conventional tires, the draining of the water in the contact area of the tire is not good enough to permit the adherence to wet ground to be as good as the adherence to dry ground.

SUMMARY OF THE INVENTION

A principal object of the present invention is to improve the drainage in the contact area without, however, disturbing any of the excellent road-keeping qualities that characterize the conventional type of tread referred to above.

The foregoing and other objects are attained in accordance with the invention by the provision of a tire whose tread has circumferential grooves describing repetitive curves, for example, broken or undulating, the aplitudes of the curves of successive grooves increasing progressively in a direction from one edge towards the other edge of the tread. The tire is characterized in that the grooves, on more than half of the width of the tread, have outlines that are substantially in phase opposition and connect with one another in such a manner that the respective segments of one groove lie substantially in extensions of the segments of an adjacent groove.

The width of the tread is the transverse distance across the tread surface between the two side edges limiting the tread or, if the edges have a rounded profile, the distance measured between the points of intersection of the two tangents drawn to the top of the side wall on both sides of the shoulders, with the circular arc snugly fitting the surface of the tread. The paths followed by the grooves are curves in the sense that they can be defined in principle by an equation (which may be first order or higher order), by the intersection of two geometrical surfaces (either of which can be plane or curved) or by the path of a moving point. In this sense, which is the usual mathematical sense, both undulations and broken lines are curves.

The invention thus contemplates arranging the tops and bottoms of adjacent broken- or undulating-line circumferential grooves substantially in phase opposition, that is to say, substantially on one and the same meridian of the tread, and connecting one groove to an adjacent groove, for instance by short straight grooves or by causing the circumferential grooves to intersect or even to penetrate into each other.

The invention thus makes it possible, with a minimum of additional grooves or even without additional grooves, to integrate in the longitudinal drainage system formed by the circumferential grooves having relatively complicated outlines, a transverse drainage network of simple outline that offers minimum resistance to the expelling of the water from the contact area. It is advantageous that the segments of the different grooves form a double system of continuous curves.

In one preferred embodiment, the grooves in accordance with the invention debouch on one of the edges of the tread in transversely extending grooves or channels. It is advantageous to provide such transverse channels with a cross-section that increases towards their lateral openings. They act as ejectors of the water that is fed to them by the transverse system of grooves. One additional advantage of this embodiment of the invention is that the water thrown transversely by the tires of the front axle of the vehicle no longer covers the contact areas of the tires of the rear axle.

In another preferred arrangement, the system of grooves extending from one of the edges of the tread over more than half the width thereof is supplemented over the remaining width of the tread by one or more circumferential grooves spaced from the preceding network by one or more circumferential ribs. A continuous circumferential rib, which may be cut transversely, occupies the other edge of the tread.

The invention results in various improvements.

First, the water is more easily collected and expelled from the contact area because of the double system of grooves, resulting in better adherence of the tire of the invention to wet roads. Second, the adherence of such a tire is generally increased by the improved flexibility of the tread which results from the integrating in the longitudinal system of grooves of a transverse system of grooves over a large portion of the tread. Third, the provision of one or more continuous ridges separated from each other by isolated circumferential grooves makes it possible to derive greater benefit from the asymmetry of the tread since it provides means both for maintaining the flexibility inherent in the double system of grooves in accordance with the invention within suitable limits and for better positioning this region of flexibility with respect to the longitudinal axis of the tread.

In general, it is preferable to arrange the zone which is drained and made flexible by the double system of grooves in accordance with the invention closer to that edge of the tread, which, when the tire is mounted on the vehicle, is located towards the inside of the vehicle.

Furthermore, the invention of course applies to tires of any structure. It is suitable in particular for radial or semi-radial tires.

BRIEF DESCRIPTION OF THE DRAWING

An understanding of additional aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
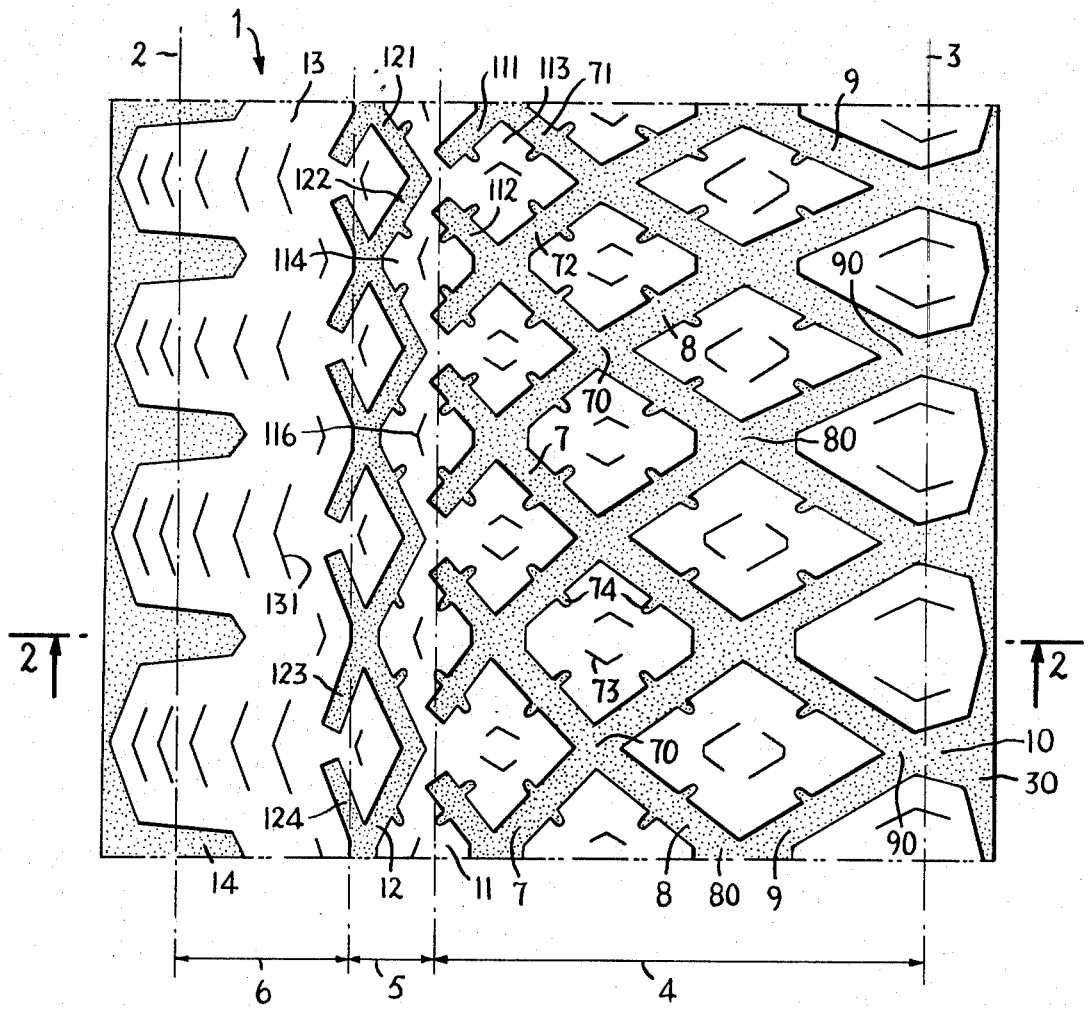
FIG. 1 is a plan view of a sector of 18° of a tread of a tire of size 185 380 or 7.35-15 in accordance with the invention.

FIG. 1 shows a portion of a tread 1 extending from one edge 2 to the other edge 3 in accordance with the definition given above (see also FIG. 2) and comprising a very flexible drainage zone 4 having a width greater than half of the width of the tread.

In the zone 4 (which adjoins the edge 3) there are three circumferential grooves 7, 8 and 9, respectively, describing curves of increasing amplitude. The curves in this case are broken-lines in phase opposition. Thus, looking from the edge 2 towards the edge 3 of the tread 1, the tops of the groove 7 coincide in the example shown in the drawing with the corresponding bottoms of the groove 8 at points 70 in the same way as the tops of the groove 8 coincide with the corresponding bottoms of the groove 9 at points 80. With regard to the tops of the groove 9, they debouch at points 90 into short channels 10 that flare out towards the edge 3 and are extended in the corresponding shoulder 24 of the tire. As indicated above, it is also in accord with the invention to replace the junction points 70 and 80, for instance, by transverse or oblique junction channels provided that the corresponding segments of the circumferential grooves 7 to 9 are substantially located in extensions of each other so as to form the transverse network of circumferential grooves in phase opposition. Under the same conditions, it is within the scope of the invention for the grooves 7 to 9 or only two of them, for instance 7 and 8 or 8 and 9, to penetrate into each other at the places of their corresponding tops and bottoms.

A continuous rib 11 separates the zone 4 from another zone 5. The zone 5 is rendered flexible and drained by means of a broken-line groove 12 and oblique channels 123 and 124 constituting extensions of the segments 122 and 121 of the grooves 12 and penetrating into, without crossing, a continuous marginal rib 13 which is wider than the rib 11. The segments 71 and 72 of the groove 7 have groove extensions 112 and 111 cut in the rib 11 without crossing it. The segments 121 and 122 of the groove 12 are located in prolongations of the extensions 112 and 111 and are substantially in phase opposition with the broken line generally defined by the groove extensions 111 and 112. The rib 11 is connected in a continuous manner to relief reinforcements 113 and 114 which give it firm support in the transverse direction and in the circumferential direction. Proper selection of the length of the channels 111 and 112 makes it possible to control the rigidifying effect of the rib 11 and reinforcements 113 and 114 on the tread without interfering with the drainage of the region occupied by the rib 11 and reinforcements 113 and 114. The groove 12, which is outside the zone 4, describes a repetitive curve of smaller amplitude than that of the curve followed by the adjacent circumferential groove 7 in the zone 4.

The marginal rib 13 is wide and continuous, is arranged along the edge 2 of the tread, and occupies a rigidifying zone 6. It is rendered flexible and drained on the side of the edge 2 by transverse grooves 14 that do not pass through it. One the side of the groove 12 it includes the oblique channels 123 and 124 described above which also contribute to flexibility and drainage.

The relief elements of the tread have notches in the form of a V which is open to a greater or lesser extent such as 73, 116 or 131, the walls of which are spaced apart by a distance of less than 0.8 mm. The same relief elements are also provided on their contours with notches such as 74 communicating with the drainage channels. The walls of the notches 74 are spaced about 2 mm apart.

In the sample described, the tread has a width $L = 135$ mm, and the zone 4 has a width of 89 mm. The circumferential groove 12 has a width of 4.5 mm, the groove 7 of 9 mm, the groove 8 of 13 mm and the groove 9 of 15.5 mm.

Figure 2:
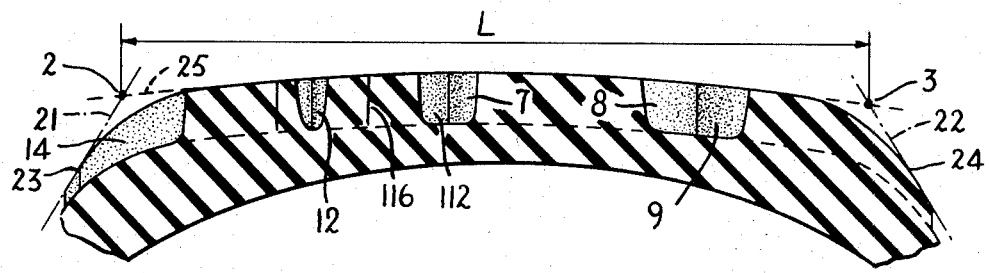
FIG. 2 is a meridian section along the line 2-2 of the sector of tread shown in FIG. 1

In FIG. 2, which is a section along the line 2—2 of the portion of the tread shown in FIG. 1, the same reference numbers have been used to designate the same elements as in FIG. 1.

FIG. 2 shows the tangents 21 and 22 to the shoulders 23 and 24 of the tire. These tangents intersect at the points 2 and 3 the circular arc 25 tangent to the tread, thus defining the width L of the tread with rounded edges shown in the drawing.

Thus there is provided in accordance with the invention a novel and highly effective pneumatic tire providing outstanding performance on wet as well ad dry road surfaces. Many modifications of the representative embodiments of the invention described above will readily occur to those skilled in the art upon study of the present disclosure. For example, while the curves of the circumferential grooves are illustrated as broken, smooth, circumferential curves, which may be sine-like, for example, are also within the scope of the invention. Accordingly, the invention is to be construed as including all the embodiments thereof within the scope of the appended claims.

I claim:

1. A pneumatic tire comprising a tread, said tread having a zone that extends over more than half the width thereof and that is formed with a plurality of circumferential grooves, each of said grooves describing repetitive curves, the amplitude of the curve described by each groove being substantially constant around the circumference of the tire, and the amplitudes of the curves described by successive grooves increasing progressively across the width of said zone, adjacent grooves describing curves in phase opposition and being connected to each other in such a manner that segments of one groove respectively lie substantially in extensions of segments of an adjacent groove.

2. A pneumatic tire according to claim 1 wherein said tread is formed at one edge with transverse grooves connected to said circumferential grooves and debouching at said one edge of the tread.

3. A pneumatic tire according to claim 1 wherein said tread is formed with at least one circumferential rib in a portion thereof outside said zone.

4. A pneumatic tire according to claim 1 wherein said tread is formed at one edge with transverse grooves connected to said circumferential grooves and debouching at said one edge of the tread and is formed at the other edge with a continuous circumferential rib.

5. A pneumatic tire according to claim 1 wherein said tread is formed at one edge with transverse grooves connected to said circumferential grooves and debouching at said one edge of the tread and is formed at the other edge with a continuous circumferential rib, said continuous circumferential rib being formed with transverse grooves extending across a part of the width thereof.

6. A pneumatic tire according to claim 1 wherein the segments of said circumferential grooves form a double network of continuous curves.

7. A pneumatic tire according to claim 1 wherein said tread is formed in a portion thereof outside said zone with an additional circumferential groove describing a repetitive curve of smaller amplitude than that of the curve followed by the adjacent circumferential groove in said zone, said adjacent circumferential groove in said zone being formed with groove extensions extending towards but not connecting with said additional circumferential groove and substantially in phase opposition therewith.

* * * * *